United States Patent [19]

Lusignan

[11] Patent Number: 5,745,084
[45] Date of Patent: Apr. 28, 1998

[54] VERY SMALL APERTURE TERMINAL & ANTENNA FOR USE THEREIN

[76] Inventor: Bruce B. Lusignan, 711 Addison Rd., Palo Alto, Calif. 94301

[21] Appl. No.: 542,493

[22] Filed: Oct. 13, 1995

Related U.S. Application Data

[63] Continuation-in-part of Ser. No. 541,757, Oct. 10, 1995, abandoned, which is a continuation-in-part of Ser. No. 259,980, Jun. 17, 1994.

[51] Int. Cl.$^6$ ................................................ H01Q 19/14
[52] U.S. Cl. ..................... 343/781 P; 343/781 R; 343/DIG. 2; 342/372
[58] Field of Search ............... 343/781 P, DIG. 2, 343/781 R, 781 CA, 782, 783; 342/372; H01Q 19/14

[56] References Cited

U.S. PATENT DOCUMENTS

| | | | |
|---|---|---|---|
| H739 | 2/1990 | Gutleber | 343/384 |
| H740 | 2/1990 | Gutleber | 342/384 |
| Re. 32,905 | 4/1989 | Baran | 370/104 |
| Re. 34,410 | 10/1993 | Rosen | 343/781 |
| 3,273,144 | 9/1966 | Fishbein | 343/5 |
| 3,308,465 | 3/1967 | Tamama | 343/100 |
| 3,680,147 | 7/1972 | Redlich | 343/792 |
| 3,916,414 | 10/1975 | Trigon et al. | 343/727 |
| 4,052,723 | 10/1977 | Miller | 343/100 |
| 4,079,380 | 3/1978 | Esry et al. | 343/100 |
| 4,085,368 | 4/1978 | Yeh | 325/304 |
| 4,090,137 | 5/1978 | Soma et al. | 325/60 |
| 4,112,721 | 9/1978 | Takase et al. | 72/12 |
| 4,129,873 | 12/1978 | Kennedy | 343/854 |
| 4,145,658 | 3/1979 | Acampora et al. | 325/180 |
| 4,152,702 | 5/1979 | Piesinger | 343/100 |
| 4,155,092 | 5/1979 | Blaese | 343/799 |
| 4,213,133 | 7/1980 | Hidaka | 343/854 |
| 4,249,181 | 2/1981 | Lee | 343/100 |
| 4,250,506 | 2/1981 | McNaul | 343/100 |
| 4,343,005 | 8/1982 | Han et al. | 343/781 P |
| 4,376,940 | 3/1983 | Miedema | 343/840 |
| 4,479,129 | 10/1984 | Skahill | 343/781 P |
| 4,562,441 | 12/1985 | Beretta et al. | 343/781 P |
| 4,567,485 | 1/1986 | Oshima et al. | 343/358 |
| 4,573,051 | 2/1986 | Farina | 343/781 P |
| 4,607,259 | 8/1986 | Dragone | 343/781 P |
| 4,651,155 | 3/1987 | Baurle et al. | 342/378 |
| 4,748,636 | 5/1988 | Kato | 375/1 |
| 4,771,289 | 9/1988 | Masak | 342/383 |
| 4,811,021 | 3/1989 | Yoshimoto et al. | 342/361 |
| 4,837,786 | 6/1989 | Gurantz et al. | 370/20 |
| 4,870,424 | 9/1989 | Lalezari et al. | 343/379 |
| 4,901,307 | 2/1990 | Gilhousen et al. | 370/18 |
| 4,905,221 | 2/1990 | Ichiyoshi | 370/18 |
| 4,941,048 | 7/1990 | Hartson et al. | 348/554 |
| 4,968,969 | 11/1990 | Drabowitch et al. | 342/188 |
| 4,985,706 | 1/1991 | Schukat | 342/352 |
| 4,985,772 | 1/1991 | Long et al. | 348/554 |
| 5,073,900 | 12/1991 | Mallinckrodt | 375/1 |
| 5,083,205 | 1/1992 | Aria | 348/555 |

(List continued on next page.)

FOREIGN PATENT DOCUMENTS

| | | | |
|---|---|---|---|
| 529210 | 8/1956 | Canada | 343/781 |

*Primary Examiner*—Hoanganh T. Le
*Attorney, Agent, or Firm*—Kenyon & Kenyon

[57] ABSTRACT

A data transmitting/receiving satellite terminal for transmitting to and receiving from a geosynchronous satellite employs an antenna having nulls in its antenna receiving pattern at a first frequency corresponding to satellites spaced at regular intervals from the satellite. In addition, a phase and amplitude compensation network adjusts a phase and amplitude of the transmitted signal to compensate for transmitting at a different frequency than for which the antenna is optimally designed. The antenna includes a main parabolic reflector, and two side parabolic reflectors offset from a plane parallel to the main parabolic reflector. Each of the reflectors uses a dual frequency feed horn to couple energy to and from the reflector to a dipole exciter to which the receiving electronics is coupled. The above terminal is particularly useful in C-Band applications.

13 Claims, 5 Drawing Sheets

U.S. PATENT DOCUMENTS

| | | | |
|---|---|---|---|
| 5,119,104 | 6/1992 | Heller | 342/450 |
| 5,127,021 | 6/1992 | Schreiber et al. | 375/1 |
| 5,177,604 | 1/1993 | Martinez et al. | 358/86 |
| 5,189,433 | 2/1993 | Stern et al. | 343/770 |
| 5,191,350 | 3/1993 | Hemmie | 343/840 |
| 5,206,954 | 4/1993 | Inoque et al. | 455/6.2 |
| 5,231,494 | 7/1993 | Wachob | 358/146 |
| 5,237,610 | 8/1993 | Gammie et al. | 380/10 |
| 5,243,353 | 9/1993 | Nakahara et al. | 343/700 |
| 5,257,106 | 10/1993 | Maruoka | 348/706 X |
| 5,262,788 | 11/1993 | Drabowitch et al. | 342/188 |
| 5,280,297 | 1/1994 | Profera, Jr. | 343/754 |
| 5,283,591 | 2/1994 | Delmas | 343/755 |
| 5,289,285 | 2/1994 | Kotaka et al. | 348/138 |
| 5,289,497 | 2/1994 | Jacobson et al. | 375/1 |
| 5,296,862 | 3/1994 | Rodeffer et al. | 342/359 |
| 5,309,167 | 5/1994 | Cluniat et al. | 343/840 |
| 5,345,473 | 9/1994 | Berg | 375/6 |
| 5,345,591 | 9/1994 | Tsurumaki et al. | 375/259 |
| 5,351,057 | 9/1994 | Hansen | 343/100 |
| 5,351,060 | 9/1994 | Bayne | 343/766 |
| 5,351,130 | 9/1994 | Dugan et al. | 358/725 |
| 5,351,239 | 9/1994 | Black et al. | 370/84 |
| 5,355,512 | 10/1994 | Profera, Jr. | 455/13.3 |
| 5,361,099 | 11/1994 | Kim | 348/555 |
| 5,376,941 | 12/1994 | Fukazawa et al. | 342/359 |
| 5,379,320 | 1/1995 | Fernandes et al. | 375/1 |
| 5,386,226 | 1/1995 | Chanteau | 348/10 |
| 5,386,587 | 1/1995 | Yuzawa | 455/3.2 |
| 5,414,431 | 5/1995 | McCoskey | 342/352 |
| 5,416,534 | 5/1995 | Hayashi et al. | 348/706 X |
| 5,418,815 | 5/1995 | Ishikawa et al. | 375/216 |
| 5,438,590 | 8/1995 | Tzukerman et al. | 375/259 |
| 5,455,960 | 10/1995 | Pelchat et al. | 455/12.1 |
| 5,461,427 | 10/1995 | Duffield et al. | 348/555 |
| 5,491,472 | 2/1996 | Kurtz | 348/706 X |

VERY SMALL APERTURE TERMINAL & ANTENNA FOR USE THEREIN

BACKGROUND OF THE INVENTION

The present application is a continuation-in-part of U.S. patent application Ser. No. 08/541,757 filed on Oct. 10, 1995 by the same inventor, now abandoned, which is a continuation-in-part of U.S. patent application Ser. No. 08/259,980, filed on Jun. 17, 1994, which is hereby incorporated by reference as if repeated herein in its entirety.

The present invention relates generally to Very Small Aperture Terminals (VSATs), and more particularly to a VSAT for use in transmitting to and from a constellation of satellites, and to an antenna for use in such a VSAT.

VSATs are two-way data transmitting/receiving terminals, which receive a stream of addressed data running from 9.6 kbit/sec up to 100 kbit/sec rates, and transmit bursts of data at similar data rates. The costs of VSATs are in excess of $10,000 for 4.8, 9.6 and 56 kbit per second two-way data services. VSAT users pay annual charges of $6,000 per year and up to providers. VSATs can be found on national franchises, such as Standard Oil gas stations in the U.S., to collect billing data. They are used all over the world to make up for poor telephone and data networks.

Currently, VSATs are sold in both C-Band and Ku-Band satellite frequencies. Ku-Band uses both six foot and three foot antennas, the smaller antennas having a ready market because of the ability of the smaller antennas to be located at the office site more easily than the six foot antennas. The six foot antennas typically need an outdoor patio or separate lot on which the antenna is mounted, whereas the three foot antennas can be mounted on a wall or a roof top.

The rain loss at Ku-Band increases the satellite segment costs about ten times as compared to C-Band, since the rain loss results in reduced data rates or higher energy per bit. The choice of a three foot antenna rather than a six foot antenna in the Ku-Band increases the space segment cost by an additional factor of four. However, for many applications the smaller size makes up for the added cost in the customer's eyes. Consequently, many three foot Ku-Band antennas are sold.

C-Band VSATs cannot be sold with three foot antennas because the beam width of a three foot antenna is too wide to isolate one C-Band satellite from another in the synchronous orbit above the equator. At C-Band, the satellite serving the U.S. are spaced by 2°. Typically, antennas of at least six foot in diameter are required to separate one satellite from another at C-Band frequencies.

The present invention is therefore directed to the problem of developing an antenna with the same area as a three foot antenna than can work within the 2° spacing limitations of existing C-Band satellites. In this way the convenience of the smaller antenna for the customer can be realized and a ten fold reduction in space segment cost over the Ku-Band version can be obtained through less sensitivity to rain loss.

SUMMARY OF THE INVENTION

U.S. patent application Ser. No. 08/259,980, filed on Jun. 19, 1994 by the same inventor, solves the problem for reception of signals from C-Band satellites. An array of three reflectors having the same area as a three foot antenna is used to synthesize a pattern that has gain at the targeted satellite and nulls in the reception pattern in the directions of satellites at ±2°, ±4°, ±6°, etc. from the targeted satellite.

The present invention extends the above concept to create a similar pattern in the transmit signal up to the satellite while maintaining the pattern of nulls in the receiving antenna despite a change in frequency. The complexity in this problem is that the receive signals are at a first frequency, e.g., 4 GHz, while the transmit signals are at a separate frequency, e.g., 6 GHz. However, the same antenna reflector must be used with a different distribution of phase and amplitude to achieve the transmit beam shape while maintaining the receive beam shape the same.

The present invention solves this problem by: (1) providing an antenna for the VSAT which divides the antenna area into three smaller apertures and controls the power from each area to produce nulls in the receiver antenna pattern to protect the received signal from interfering signals being transmitted from satellites at ±2° spacings in geosynchronous orbit; and (2) adjusting the phase and amplitude of the transmitted signal for each of the three smaller apertures to compensate for the change in frequency from receiving to transmitting.

The receive part of the VSAT antenna for C-Band will use the receiving antenna disclosed in U.S. Pat. No. 08/259,980 to enable a three foot equivalent dish for receiving at 4 GHz with satellites spaced as close as ±2° apart. In addition, the antenna of the present invention includes the ability to transmit at a frequency of 6 GHz, with control of the power to the three sections of the antenna to work with satellites spaced as closely as 2° separation. To do this requires a dual frequency antenna feed, which are known, hence further description is not necessary.

The other component of the present invention is the ability to select the power and phase to each of these three dishes to achieve the desired antenna pattern, and to achieve it on the same antenna which is designed to achieve the desired antenna pattern for reception at a different frequency (i.e., 4 GHz). This concept includes implementation by separate 4 GHz and 6 GHz connecting networks behind the three dishes.

Thus, the invention makes possible a C-Band VSAT with an antenna having the surface area equivalent to a three foot dish. The cosmetic arguments of a small antenna with the surface area of a three foot dish versus a six foot dish are significant. Because of the lack of rain absorption at C-Band, the small C-Band VSAT has a ten fold cost advantage over the three foot Ku-Band dish for space segment cost. If the cost of the Ku-Band service costs $6000 per year for the space segment, the C-Band service has $600/year costs for exactly the same service and roughly the same antenna surface area.

DETAILED DESCRIPTION

Figure 2:
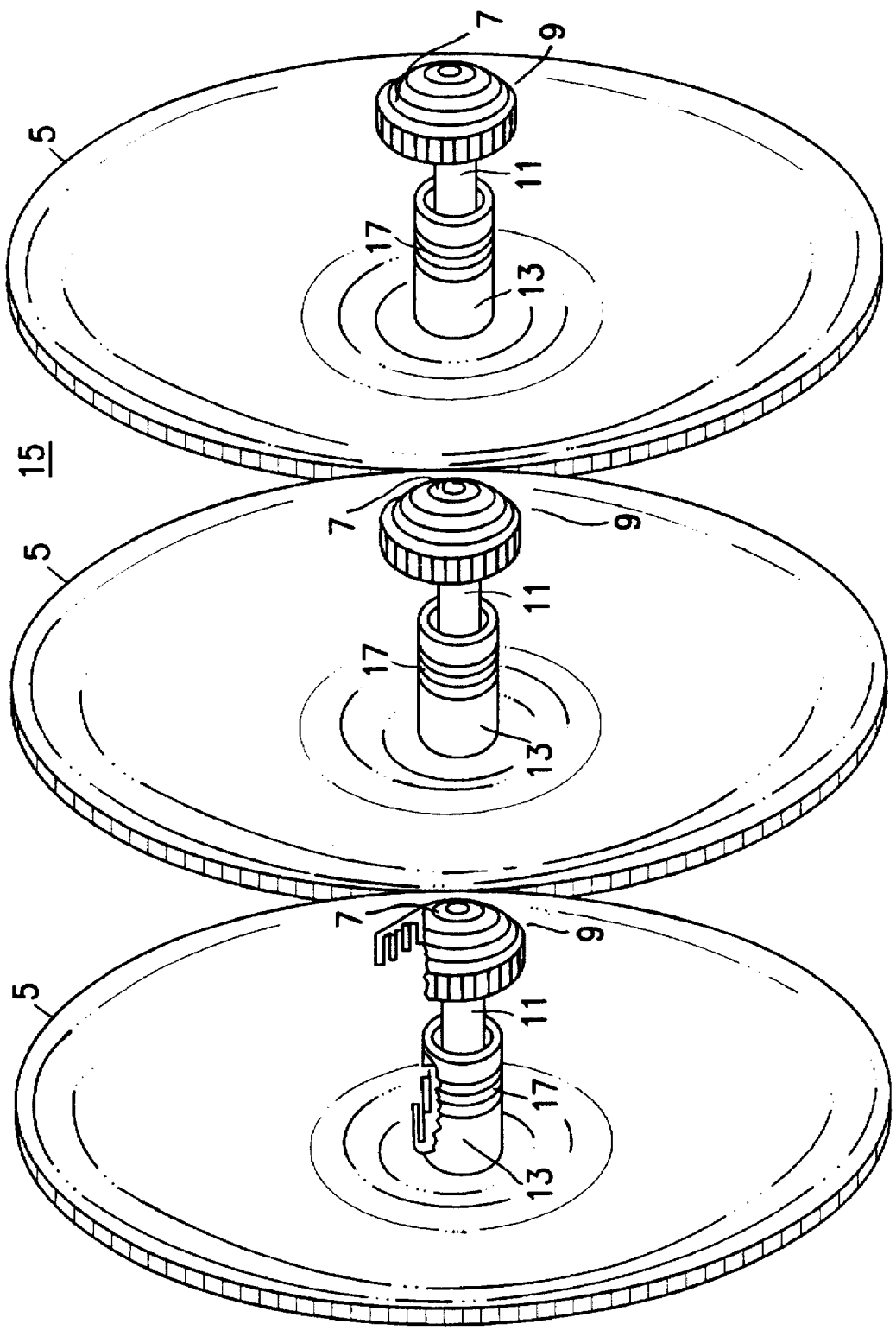
FIG. 2 depicts one embodiment of the antenna of the present invention for use in the VSAT system depicted in FIG. 1.

As shown in FIG. 2, the antenna 15 used in the present invention includes three identically shaped parabolic reflectors 5 connected side by side. The three reflectors 5 are connected by transmission lines to a combiner box 25 (FIG. 4) behind the center reflector 1. In this application, one polarization (e.g., vertical polarization) is dedicated to transmission and the other (e.g., horizontal polarization) is dedicated to reception. The satellite 17 receives the uplink signal at 6 GHz with one polarization and broadcasts the signal at 4 GHz using the opposite polarization. Behind the main reflector is one low noise amplifier (LNA) 22 for reception and one high power amplifier (HPA) 24 for transmission.

The receive signals will be carried from the LNA 22 to the indoor unit 10 (receiver) by cable. The transmit signals will be carried to the HPA 24 from the indoor unit 10 (transmitter) by the same cable. The LNA 22, HPA 24 and transmitter/receiver 10 are not part of the present invention, but are existing equipment.

The division of power between the center reflector 1 and the two side reflectors 2, 3 will be different for the transmit function at 6 GHz than the receive function, which occurs at 4 GHz. The combination of phase and amplitude for the signal for each reflector is chosen to avoid interference with adjacent satellites at ±2° spacings at 6 GHz during transmission.

Figure 1:
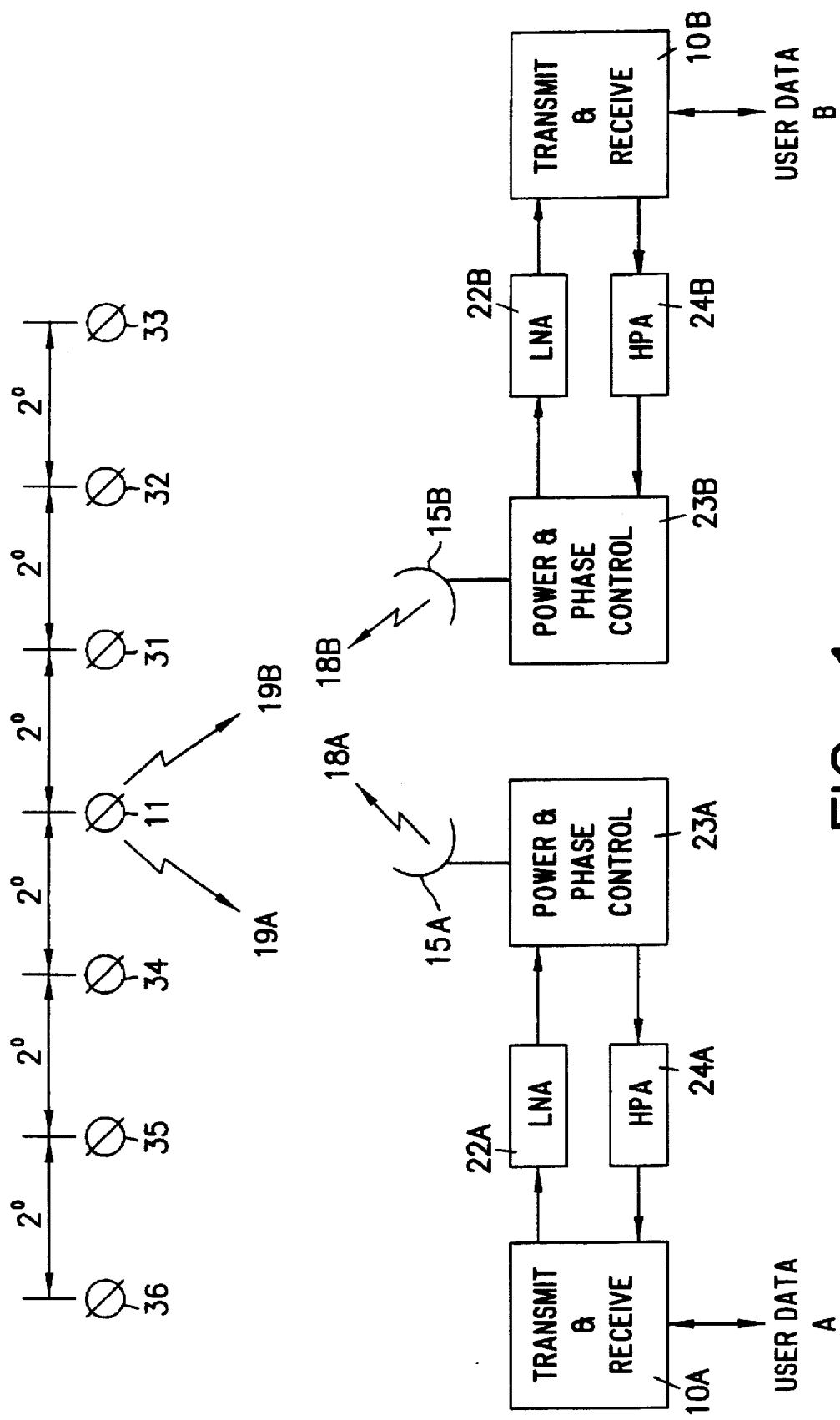
FIG. 1 depicts the overall VSAT system of the present invention.

FIG. 1 depicts the two way VSAT system of the present invention. User A sends user data to the transmitter/receiver 10A, which is a known device. The transmitter/receiver 10A then sends an RF signal to the power and phase control unit 23A. The power and phase control unit 23A controls the power and phase to each of the three apertures 5 (see FIG. 2) of the antenna 15A to compensate for the antenna 15A, which is designed to receive signals at 4 GHz, and consequently to transmit signals at that same frequency unless compensation is performed. To compensate for the change in frequency, the present invention creates gains and nulls in the antenna transmit pattern that match the orbital configuration of the satellites so that the targeted satellite will successfully receive the signal, while the adjacent satellites will not.

The antenna 15A radiates a 6 GHz RF signal 18A to the satellite 17, which is in geosynchronous orbit around the earth. The satellite 17 then relays the RF signal 18A as RF signal 19B at 4 GHz, which is then received by a large central hub station serving all the VSATs in the network. The central hub station uses a large antenna, typically 30 feet in diameter. This central station connects either directly to fiber networks or other high capacity networks. If the data is going to another small VSAT it is relayed back to a station such as the patented system or to another standard station.

Transmitter & Receiver

The transmitter/receiver 10 is a known device, one example of which is designed by Hughes Network Systems and is manufactured by various suppliers. Therefore, additional description of its innerworkings is not necessary to understand the present invention. It is sufficient to state that this transmitter/receiver 10 will convert the received signal to user data and will convert user data to a signal ready to be transmitted by the antenna 15 of the present invention.

Antenna

As shown in FIG. 2, the antenna 15 employs three parabolic dishes 5, each of which have a feed 13 tube and a subreflector 9. The subreflector 9 has several grooves 7, each of which have a radius equal to slightly more than ¼ of the wavelength of the received signal. In the alternative, the grooves 7 may vary in depth so each groove corresponds to a different frequency within the bandwidth of the received signal. For example, if three grooves were desired, then the first groove has a radius slightly greater than ¼ * (4 GHz+δ/2), the second groove has a radius slightly greater than ¼ * (4 GHz+3δ/2), and the third groove has a radius slightly greater than ¼ * (4 GHz+5δ/2), where:

$$\delta = \frac{BANDWIDTH}{(NUMBER\ OF\ GROOVES)} \quad (1)$$

In addition, the feed tube 13 has at least two grooves 17 at the entrance of the feed tube, which also have a radius slightly more than ¼ of the wavelength of the received signal. These grooves help prevent losses of signal due to extraneous currents being excited at the entrance of the feed tube 13 and on the subreflector 9.

Figure 3:
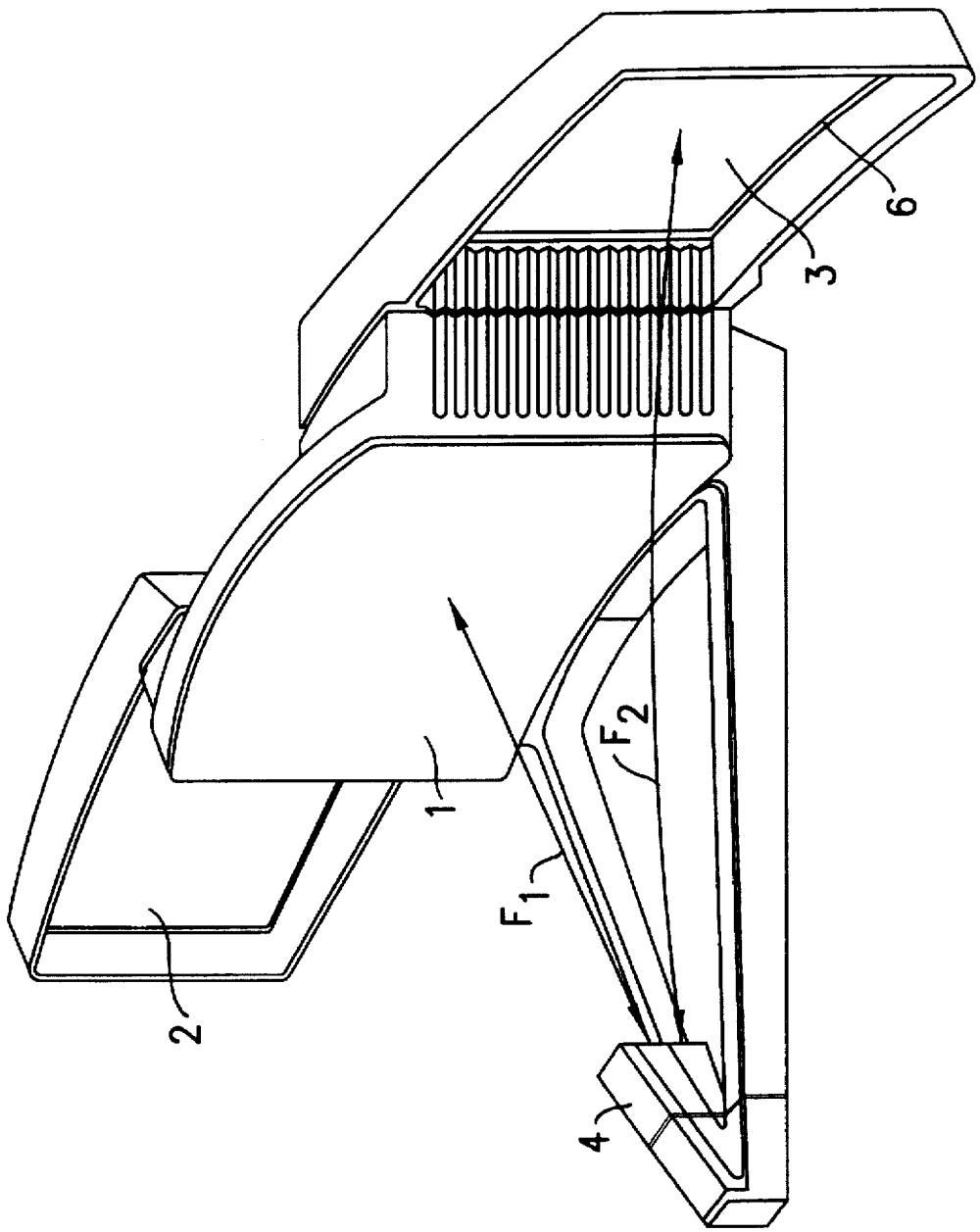
FIG. 3 depicts a second embodiment of the antenna of the present invention for use in the VSAT system depicted in FIG. 1.

FIG. 3 depicts an alternative embodiment of the antenna 15, in which the outer two dishes 2 and 3 are offset from the main dish 1 in a fresnel step ($F_1$–$F_2$), and the antenna 15 includes a single feed 4 and rectangular reflectors 1, 2 and 3. This embodiment could also employ separate feeds for each of the rectangular reflectors, as in the other embodiment in FIG. 2. In both embodiments, the antenna 15 is optimized to receive a 4 GHz RF signal from a geosynchronous orbiting C-Band satellite 17, which is already in existence. One example of this satellite for which the present invention is designed to transmit through is AT&T Telstar satellite. The antenna is then optimized for transmission by the power and phase control unit 23, which is described below.

Power and Phase Control

The present invention requires the use of a power and phase control unit 23 to compensate for the antenna design. To transmit a signal at 6 Ghz, the power and phase control unit 23 adjusts the power and phase of each signal being radiated by each of the three reflectors 1, 2 and 3 to correct the radiated antenna pattern for transmitting at 6 GHz rather than 4 GHz. All other components of the antenna 15 can remain the same during transmission and reception, which greatly simplifies the antenna design.

Figure 4:
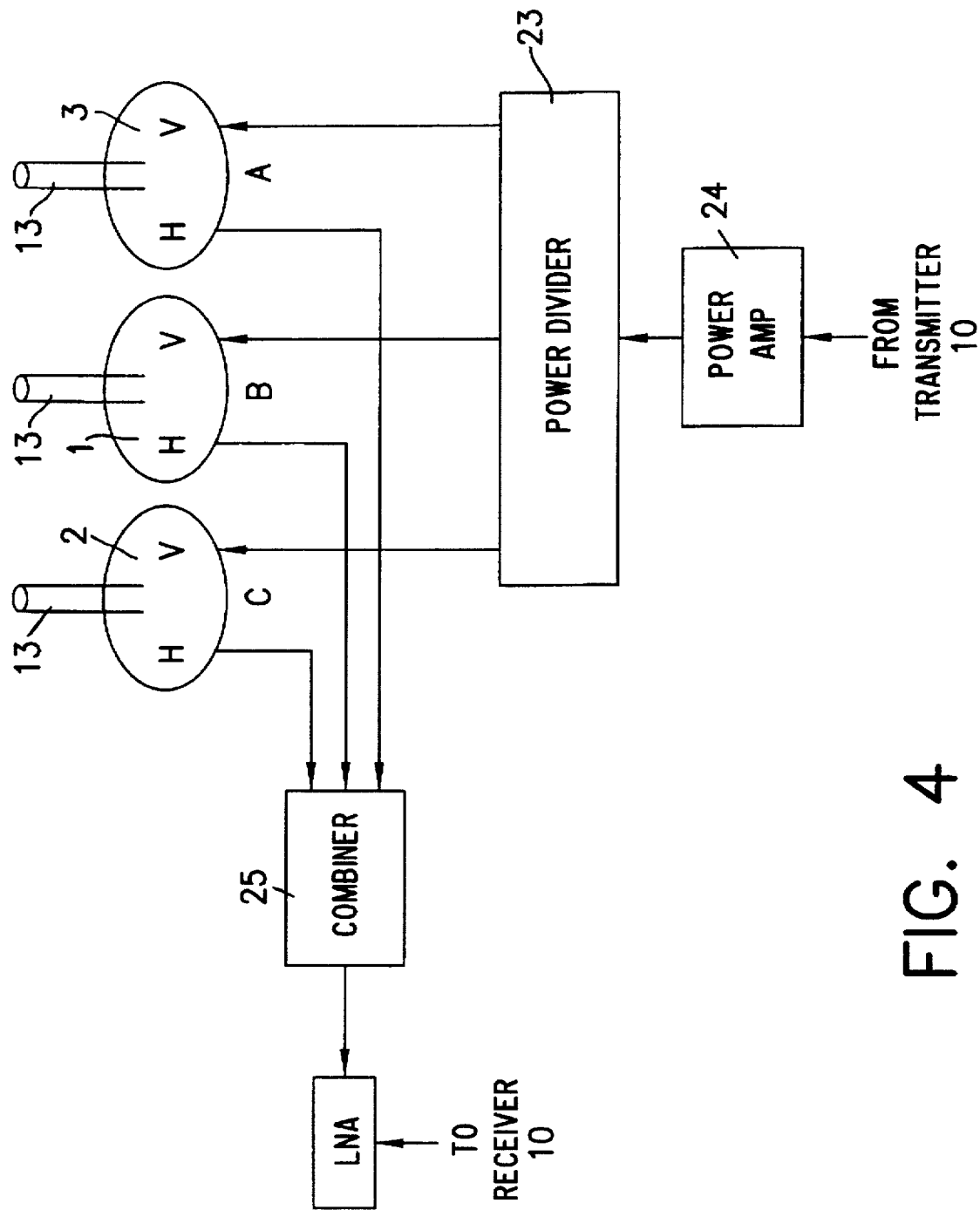
FIG. 4 depicts the power and phase control according to the present invention.

FIG. 4 depicts in detail the power and phase control unit 23 of the present invention. In the receive mode, the signals from the three dishes A, B and C are added together by combiner 25 and coupled to the LNA 22. In the transmit mode, the signal from the high power amplifier (HPA) 24 is split by power divider 25 to the three dishes A, B and C in unequal amounts as described below.

In the principal realization of the previous invention U.S. patent application Ser. No. 08/259,980, the three reflector antennas received 4 GHz signals coming from the satellite. Each antenna section has a gain of equal magnitude, e.g., about 25 dB and a beamwidth that is about 8° to the ½ power points. This beamwidth of 8° is not sufficient to suppress interference from satellites (FIG. 1, elements 31–36) that are at ±2°, ±4°, ±6° orbit locations. However, the distribution of the energy across each aperture and the spacing of the three apertures from each other results in an antenna pattern that has a null towards the satellites at ±2° in orbit location from the central satellite, another pair of nulls towards the satellites at ±4° in orbit, and lower gain beyond that.

The spacing in the preferred realization is 22" from the central antenna axis to the axis of the right section and the axis of the left section (44" from the right antenna axis to the left antenna axis). With equal power received from these three antennas at 4 GHz, the desired antenna pattern is achieved in the receive mode.

For the 6 GHz C-Band transmit frequency, equal power from the three antennas would result in null patterns in the wrong positions because of the different wavelength at this frequency. If the same antenna reflectors are to be used, then the antenna synthesis design must be altered.

The desired solution will divide the transmitter output power into three components. The center reflector will be fed one unit of power. The two side reflectors will each receive 0.295 units of power. The total generated power is:

$$\text{Total Power} = W(1+0.295+0.296) \text{ [Watts]} \tag{2}$$

where W is a number dependent on the data rate of the VSAT station.

W watts goes into the center reflector and 0.295 W watts goes to each of the side reflectors. At 6 GHz, each of the three sections has a gain of 29 dB.

At the satellite, the fields from the three sections will combine to produce a signal level. If the receiver is on the center line, they all combine in phase giving an added gain of:

$$G_c = G\left[\frac{(1+2\sqrt{0.295})^2}{1+2 \times 0.295}\right] = \frac{4.35}{1.59} = 2.73 \tag{3}$$

in dB; thus the array gain is 4.4 dB greater than the gain of one section.

$$G_c = 29 + 1.2 = 30.2 \text{ dB} \tag{4}$$

The satellite separation is 2° in orbit locations. Viewed from the surface of the earth the separation appears to be somewhat wider, i.e., 2.25°.

At a location 2.25° away from the beam center the phase angle of the signals from the three antennas will vary. One side antenna will have a phase that is ahead by $$\phi = \frac{D \sin\alpha}{\lambda} \times 360° \tag{5}$$

where D is the distance from the center antenna axis to the side antenna axis, α is the angle, 2.25° for the first satellite, and λ is the wavelength (λ=C/f=1.97 inches for 6 GHz, where C is the speed of light in freespace, i.e., 3×10⁸ meters/sec). Thus, $$\phi = \frac{22 \text{ inches} \cdot \sin 2.25°}{1.97 \text{ inches}} \times 360° = 158° \tag{6}$$

Thus, at C-Band the signals from one side reflector will be 158° ahead of signals from the center reflector. Signals from the other side reflector will be 158° behind.

The three fields will add together as field vectors. The magnitude of each field is proportional to the square root of the power in the field.

$$|E_{center}| \propto \sqrt{1} = 1$$

$$|E_{left}| \propto \sqrt{0.295} = 0.543$$

$$|E_{right}| \propto \sqrt{0.295} = 0.543 \tag{7}$$

Figure 5:
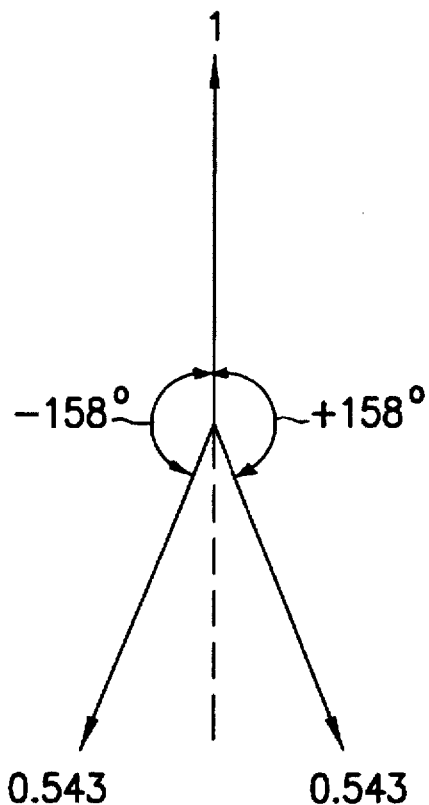
FIGS. 5 and 6 depict vectorial representations of the signals being received at the satellite.

The three phase vectors are shown in FIG. 5. As can be seen, the vector components perpendicular to the reference axis cancel to zero. The components along the reference axis sum to:

$$F_{2.25} = 1 + 0.543 \cos(158°) + 0.543 \cos(-158°)$$

$$F_{2.25} = 1 - 0.5 - 0.5 = 0 \tag{8}$$

The fields all cancel at 2.25° from the center axis, thus causing the null in the desired position. The equations are symmetrical so that cancellation is also achieved at −2.25°. At the points ±5.25° from the center satellites, the equation gives:

$$\phi = 315° \tag{9}$$

Figure 6:
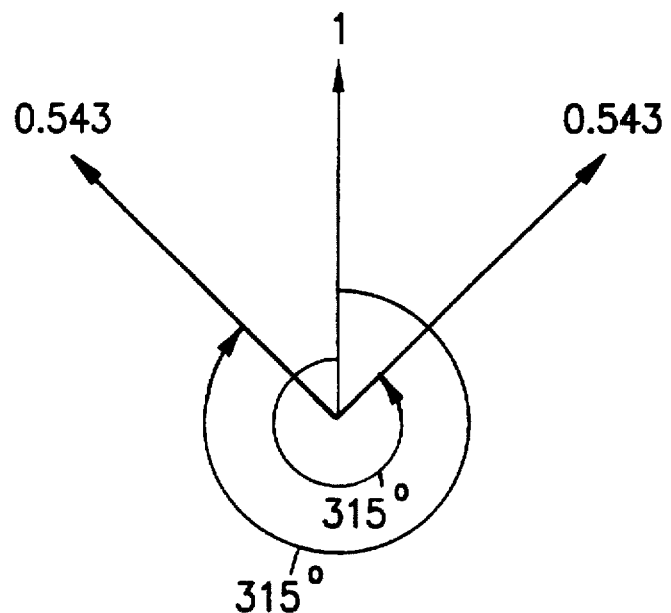

The vectors in these positions are shown in FIG. 6. The vector at ±4.5° is equal to $$F_{4.5°} = 1 + 2 \times 0.543 \cos 315° = 1.76 \tag{10}$$

The power in this vector is proportional to the square of this value. The gain, as before, is proportional to the ratio of the above power to the total reference power.

$$\Delta G = \frac{(1.76)^2}{1 + 2 \times (0.543)^2} = \frac{3.09}{1.59} = 1.94 \tag{11}$$

This gives a gain of 2.9 dB higher than the individual gain from one reflector. However, the gain of the individual reflectors at a distance of ±4.5° off the main axis is down at least 15 dB, the 3 dB beamwidth of a 22 inch reflector at 6 GHz is only 6°. The individual reflector pattern is thus designed to create nulls at ±4.5° while the combination of the three reflectors and power levels are designed to create nulls at ±2.25°.

A custom power divider 23 is used to separate the transmit power into the three components with power ratios 1, 0.295, 0.295. This is done by stripline power dividers commonly used in multi-feed antenna structures such as those used in radar antennas and in the shaped beams of synchronous satellites serving national systems. Such components are known devices.

In addition, the polarization is different in the receive and transmit modes. For example, vertical polarization could be used for the transmit mode, while horizontal polarization could be used for the receive mode.

Thus, the present invention discloses a two-way data terminal having a very small aperture antenna. The VSAT system of the present invention can send data at data rates up to 100 kBit/second at 4–6 GHz to existing C-Band satellites. By employing a very small antenna, i.e., the antenna has the surface area of a three-foot radius dish, the present invention makes C-Band VSATs extremely attractive on a cost basis, since no new satellites need be launched and in comparison to Ku-Band, C-Band has 10 dB less power requirements due to rain margin.

While the above VSAT terminal has been described for use in C-Band applications, the general concept is applicable to any frequency (e.g., Ku-band), where the size of the antenna cannot be reduced further due to satellite spacings. In other words, where the size of the antenna could be reduced but for the problem that the resulting antenna would encompass more than one satellite in the constellation, the present invention is applicable, even though the frequency might be different. In this case, the calculations need to be scaled in a known manner according to the difference in frequency.

What is claimed is:

1. A data transmitting/receiving satellite terminal for transmitting to and receiving from a geosynchronous satellite comprising:

a) an antenna having an aperture forming an antenna receiving pattern with nulls at a first frequency, said nulls corresponding to satellites spaced at regular intervals from the satellite; and b) a phase and amplitude compensation network coupled to said antenna, said compensation network adjusting a phase and amplitude of a transmitted signal to compensate for transmitting at a second frequency different than the first frequency, wherein the antenna aperture further comprises a main parabolic reflector and two side parabolic reflectors.

2. The satellite terminal according to claim 1, wherein the phase and amplitude compensation network compensates each signal being sent to each of the reflectors satisfying the following relationship:

$$\text{Total Power} = W(1+0.295+0.295)$$

where W=the power to the main reflector in Watts, and 0.295 represents the approximate power of each signal being sent to the side reflectors, and the phases of the signals being sent to the one side reflector, to the main reflector and to the other side reflector are all equal.

3. The satellite terminal according to claim 2, wherein the phase and amplitude compensation network compensates for the difference in frequency by modifying the power and phase of each signal being radiated from the main reflector and the two side reflectors so that nulls in the transmit pattern of the antenna at the transmit frequency match the satellite orbital configuration.

4. The satellite terminal according to claim 1, wherein the phase and amplitude compensation network compensates for the difference in frequency by modifying the power and phase of each signal being radiated from the main reflector and the two side reflectors so that nulls in the transmit pattern of the antenna at the transmit frequency match the satellite orbital configuration.

5. An apparatus for sending signals to and receiving signals from a satellite, comprising:

a) means for creating nulls in a receiving antenna pattern matched to satellites spaced from the satellite at regular intervals, which receiving antenna pattern is defined at a first frequency; and b) means for compensating for a transmitting antenna pattern by adjusting a phase and amplitude of a transmitted signal, which transmitting antenna pattern is defined at a second frequency, wherein the means for creating nulls comprises a main parabolic reflector, and two side parabolic reflectors.

6. The apparatus according to claim 5, wherein the means for compensating comprises a coupling network which adjusts the phase and amplitude of the transmitted signal for each of three apertures of the means for creating nulls.

7. The satellite terminal according to claim 6, wherein the means for compensating compensates for the difference in frequency by modifying the power and phase of each signal being radiated from the main reflector and the two side reflectors so that nulls in the transmit pattern of the antenna at the transmit frequency match the satellite orbital configuration.

8. The satellite terminal according to claim 5, wherein the means for compensating compensates for the difference in frequency by modifying the power and phase of each signal being radiated from the main reflector and the two side reflectors so that nulls in the transmit pattern of the antenna at the transmit frequency match the satellite orbital configuration.

9. A data transceiver for transmitting to and receiving from within a satellite system, which includes a desired satellite and a plurality of interfering satellites, comprising:

an antenna having an aperture shaped to create an antenna receiving pattern including a main lobe having gain for the received signal at a first frequency from the desired satellite and a null for each of at least four of the plurality of interfering satellites; and a phase and amplitude compensation network coupled to said antenna, said compensation network adjusting a phase and amplitude of a transmitted signal to compensate for transmitting at a frequency different than the first frequency, wherein the aperture has at least three primary areas, and wherein said compensation network adjusts the phase and amplitude of a transmitted signal to each of the three primary areas of said antenna.

10. A data transceiver for receiving at a first frequency from and transmitting at a second frequency to a first satellite having at least four adjacent satellites, comprising:

an antenna shaped to form an antenna receiving pattern including a main lobe having a null for each of the four adjacent satellites; and a phase and amplitude compensation network connected to said antenna, said compensation network adjusting the phase and amplitude of a transmitted signal to form an antenna transmitting pattern including a main lobe having a null for each of the four adjacent satellites, wherein said antenna includes three primary areas, and wherein said compensation network adjusts the phase and amplitude of a transmitted signal to each of the three primary areas of said antenna.

11. The data transceiver of claim 10, wherein said three primary areas comprise a center primary antenna area and two outer primary antenna areas, and said compensation network adjusts each signal to each of the three primary areas of said antenna satisfying the following relationship:

$$\text{Total Power} = W(1+0.3+0.3)$$

where W=the power to the center primary antenna area in Watts, and 0.3 represents the approximate power of each signal being sent to the two outer primary antenna areas, and the phases of the signals being sent to each primary antenna area are all equal.

12. A data transceiver for receiving at a first frequency from and transmitting at a second frequency to a first satellite having at least four adjacent satellites, comprising:

an antenna shaped to form an antenna receiving pattern including a main lobe having a null for each of the four adjacent satellites; and a phase and amplitude compensation network coupled to said antenna, said compensation network adjusting the phase and amplitude of a transmitted signal to form an antenna transmitting pattern including a main lobe having a null for each of the four adjacent satellites, wherein said antenna is shaped to include a main parabolic reflector and two side parabolic reflectors, and wherein said compensation network adjusts the phase and amplitude of a transmitted signal to the main parabolic reflector and two side parabolic reflectors.

13. The data transceiver of claim 12, wherein said compensation network adjusts each signal to the main reflector and the two side reflectors satisfying the following relationship:

$$\text{Total Power} = W(1+0.29+0.29)$$

where W=the power to the main parabolic reflector in Watts, and 0.29 represents the approximate power of each signal being sent to each side parabolic reflector, and the phases of the signals being sent to the main parabolic reflector and two side parabolic reflectors are all equal.

\* \* \* \* \*